(12) United States Patent
Chen et al.

(10) Patent No.: US 10,381,914 B2
(45) Date of Patent: Aug. 13, 2019

(54) INTEGRATED TRANSFORMER

(71) Applicant: Texas Instruments Incorporated, Dallas, TX (US)

(72) Inventors: Runruo Chen, Plano, TX (US); Sheng-yang Yu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/908,591

(22) Filed: Feb. 28, 2018

(65) Prior Publication Data

US 2018/0191235 A1 Jul. 5, 2018

Related U.S. Application Data

(60) Provisional application No. 62/534,465, filed on Jul. 19, 2017.

(51) Int. Cl.
*H02M 1/08* (2006.01)
*H02M 3/335* (2006.01)
(Continued)

(52) U.S. Cl.
CPC ............ *H02M 1/083* (2013.01); *H01F 27/24* (2013.01); *H01F 27/28* (2013.01);
(Continued)

(58) Field of Classification Search
CPC .. H02M 1/083; H02M 3/33592; H02M 3/335; H02M 3/33576; H02M 2001/0058;
(Continued)

(56) References Cited

U.S. PATENT DOCUMENTS 2,137,433 A 11/1938 Wirz
2,611,885 A 9/1952 Bridges
(Continued)

FOREIGN PATENT DOCUMENTS

WO 2008101367 A1 8/2008

OTHER PUBLICATIONS

McDonald et al., "Digital Control Provides LLC Performance Enhancements", Texas Instruments, Power Electronics, Aug. 5, 2013, 9 pgs.
(Continued)

*Primary Examiner* — Jue Zhang
*Assistant Examiner* — Afework S Demisse
(74) *Attorney, Agent, or Firm* — Tuenlap Chan; Charles A. Brill; Frank D. Cimino

(57) ABSTRACT

Apparatus providing an integrated transformer are disclosed. An example apparatus includes a power conversion system including a switching circuit including a first primary side transistor coupled between a first input node and a switching node, and a second primary side transistor coupled between the switching node and a second input node, a series circuit including a transformer primary winding, a capacitor, and an inductor coupled in series between the switching node and the second input node, a transformer secondary circuit including a first transformer secondary winding and a second transformer secondary winding, the first and the second transformer secondary windings electrically between a first converter output and a second converter output, the transformer primary winding and the transformer secondary windings wound around at least a portion of a corresponding one of a transformer core in an infinity winding arrangement.

20 Claims, 13 Drawing Sheets

(51) Int. Cl.
*H01F 27/28* (2006.01)
*H01F 27/24* (2006.01)
*H02M 1/00* (2006.01)

(52) U.S. Cl.
CPC ........ *H01F 27/2804* (2013.01); *H02M 3/335* (2013.01); *H02M 3/33576* (2013.01); *H02M 3/33592* (2013.01); *H01F 2027/2819* (2013.01); *H02M 2001/0058* (2013.01); *Y02B 70/1475* (2013.01); *Y02B 70/1491* (2013.01)

(58) Field of Classification Search
CPC ...... H01F 27/2804; H01F 27/24; H01F 27/28; H01F 2027/2819
See application file for complete search history.

(56) References Cited

U.S. PATENT DOCUMENTS

| | | | |
|---|---|---|---|
| 3,531,708 | A | 9/1970 | Kuba |
| 4,675,796 | A | 6/1987 | Gautherin et al. |
| 6,344,979 | B1 | 2/2002 | Huang et al. |
| 8,629,627 | B2 | 1/2014 | Cohen et al. |
| 8,681,520 | B2 | 3/2014 | Tao |
| 8,717,784 | B2 | 5/2014 | Park et al. |
| 9,257,913 | B1 | 2/2016 | McDonald |
| 2009/0244933 | A1 | 10/2009 | Wang et al. |
| 2010/0103710 | A1 | 4/2010 | Reddy |
| 2011/0063881 | A1 | 3/2011 | Dabak et al. |
| 2011/0299301 | A1 | 12/2011 | Huang |
| 2011/0305044 | A1 | 12/2011 | Huang |
| 2011/0316430 | A1 | 12/2011 | Cohen et al. |
| 2012/0176824 | A1 | 7/2012 | Franklin et al. |
| 2012/0287680 | A1 | 11/2012 | Luo et al. |
| 2013/0121033 | A1 | 5/2013 | Lehn et al. |
| 2013/0194832 | A1 | 8/2013 | Han et al. |
| 2013/0279205 | A1 | 10/2013 | Keung |
| 2016/0308661 | A1* | 10/2016 | Liebl .................... H04L 5/1461 |

OTHER PUBLICATIONS

Huang, "Designing an LLC Resonant Half-Bridge Power converter", Power Supply Design Seminar, 2010, SEM1900, Topic 3, TI Literature No. SLUP263, available at power.ti.com/seminars, 30 pgs.

UCD3138 Highly Integrated Digital Controller for Isolated Power, Data Manual, Texas Instruments, Literature No. SLUSAP2F, Mar. 2012, Revised Nov. 2013, 78 pgs.

Yan et al., "A Novel Transformer Structure for High Power, High Frequency Converter", Power Electronics Specialists Conference, 2007. PESC 2007. IEEE, 5 pgs.

Yang et al., "LLC Resonant Converter for Front End DC/DC Conversion", Applied Power Electronics Conference and Exposition, 2002. APEC 2002. Seventeenth Annual IEEE, 5 pgs.

Huang et al., "LLC Resonant Converter with Matrix Transformer", IEEE Transaction on Power Electronics, vol. 29, No. 8, Aug. 2014, 9 pgs.

Seeman et al., "Advantages of GaN in a High-Voltage Resonant LLC Converter", Texas Instruments, Applied Power Electronics Conference and Exposition (APEC), 2014 Twenty-Ninth Annual IEEE, Mar. 2014, 8 pgs.

Yang et al., "Integrated Magnetic for LLC Resonant Converter", Applied Power Electronics Conference and Exposition, 2002. APEC 2002. Seventeenth Annual IEEE, 6 pgs.

"Feedback Loop Design of an LLC Resonant Power Converter", Texas Instruments, Application Report, SLUA582A-Oct. 2010—Revised Nov. 2010, 9 pgs.

Pollock et al., "Modelling Foil Winding Configurations with Low AC and DC Resistance", IEEE Power Electronics Specialists Conference, Jun. 2005, pp. 1507-1512.

Hu et al., "Optimization of Shapes for Round Wire, High Frequency Gapped Inductor Windings", IEEE Industry Applications Society Anual Meeting, Oct. 1998, pp. 907-911.

Yang, "Topology Investigation for Front End DC/DC Power Conversion for Distributed Power System", Ph.D. dissertation, Virginia Polytechnic Institute and State University, Sep. 12, 2003, 332 pages.

Fu, "Topology Investigation and System Optimization of Resonant Converters", Ph.D. dissertation, Virginia Polytechnic Institute and State University, Feb. 4, 2010, 211 pages.

Chen et al., "Design and magnetics optimization of LLC resonant converter with GaN," 2017 IEEE Applied Power Electronics Conference and Exposition (APEC), Tampa, FL, 2017, pp. 94-98.

U.S. Appl. No. 15/674,836, "LLC Resonant Converter With Integrated Magnetics", filed Aug. 11, 2017, 38 pages.

* cited by examiner

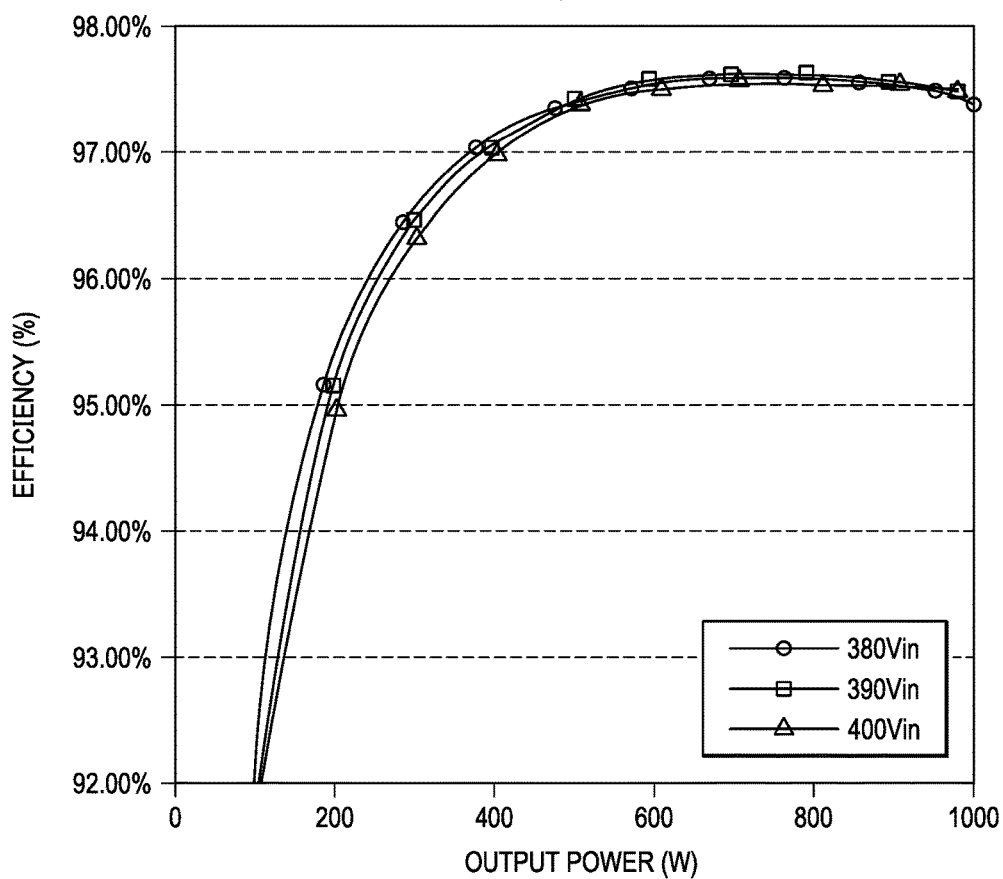

INTEGRATED TRANSFORMER

RELATED APPLICATION

This patent arises from an application claiming the benefit of U.S. Provisional Application Ser. No. 62/534,465, which was filed on Jul. 19, 2017. U.S. Patent Application Ser. No. 62/534,465 is hereby incorporated herein by reference in its entirety. Priority to U.S. Patent Application Ser. No. 62/534,465 is hereby claimed.

FIELD OF THE DISCLOSURE

This disclosure relates generally to power converters and, more particularly, to integrated transformers.

BACKGROUND

LLC converters are a form of series resonant converters that provide an output voltage signal isolated from an input signal. LLC resonant converters are capable of high efficiency and high power density, and can provide zero voltage switching and low turn off current for primary-side switches over a wide load range. However, magnetics used for LLC resonant converters remain a limitation to increased converter efficiency due to core loss and winding loss, particularly at high-switching frequencies.

BRIEF DESCRIPTION OF THE DRAWINGS

FIG. 11 is an example graph depicting measured and estimated efficiency with respect to output power of the example LLC resonant converter with the integrated LLC transformer of FIG. 1.

Figure 1:
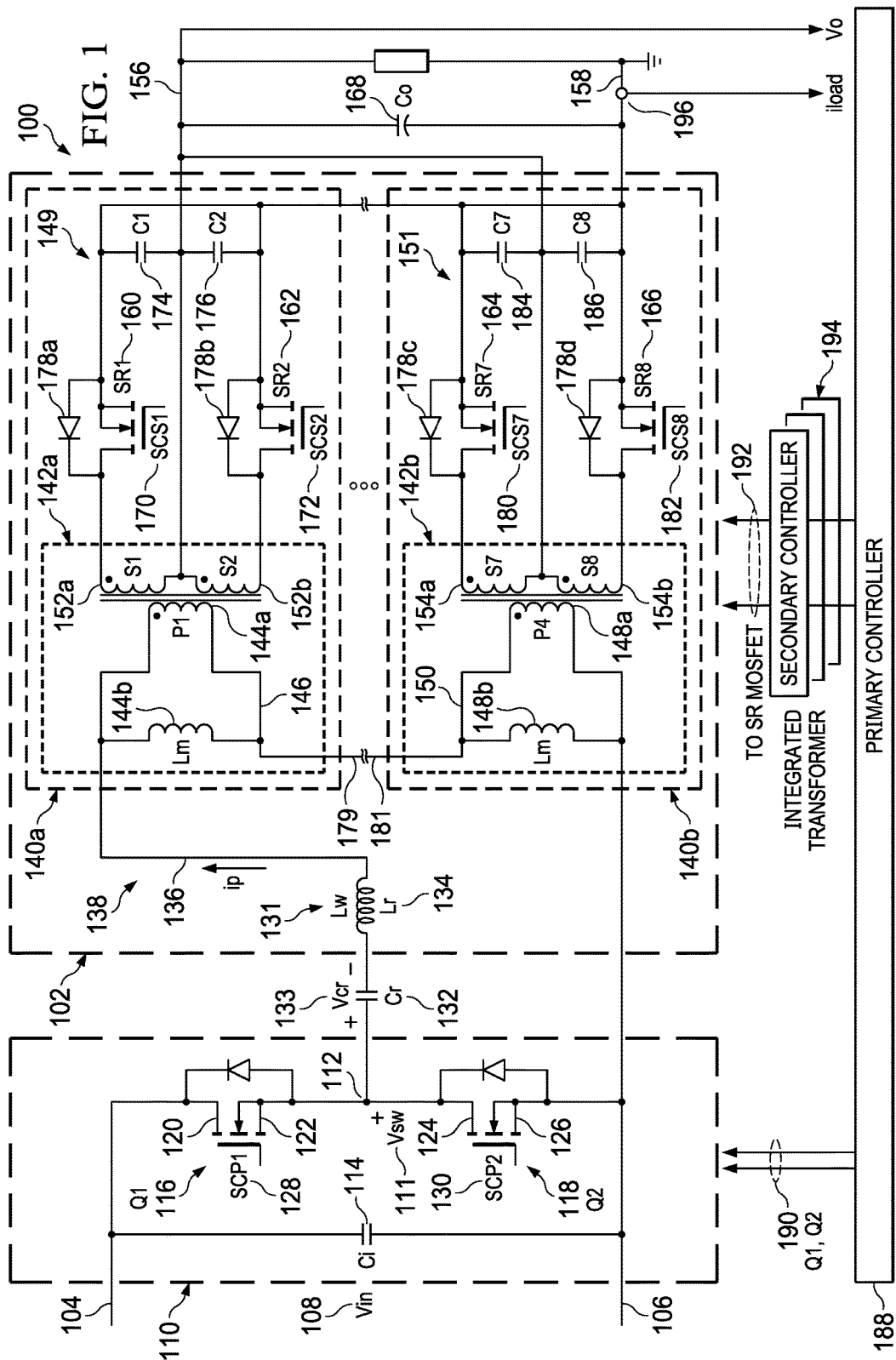
FIG. 1 depicts an example power conversion system implemented as an example LLC resonant converter including an example integrated LLC transformer magnetic circuit.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

LLC converters are a form of series resonant converters that provide an output voltage signal isolated from an input signal. LLC converters include a series resonant circuit with a transformer primary winding. A switching circuit alternately couples a switching node of a resonant circuit, or tank circuit, to a positive supply node and a ground node to provide an alternating resonant current flow through the transformer primary winding. A transformer secondary provides voltage to a secondary circuit, such as a rectifier, that provides an output voltage to drive a load. The secondary circuit may include synchronous rectifier switches or diode rectifiers. The primary side switching circuit can be adjusted to regulate the output voltage. LLC resonant converters are capable of high efficiency and high power density, and can provide zero voltage switching and low turn-off current for primary-side switches over a wide load range. Such benefits make LLC resonant converters desirable for a variety of applications, such as high-performance server and telecommunication applications.

In some examples, when the primary side switching frequency is lower than the resonant frequency of the tank circuit, the secondary side synchronous rectifier devices can be turned off with zero-current switching. Turning off the secondary side devices with zero-current switching facilitates voltage gain boost capability without efficiency deterioration for applications with a hold-up time requirement. Operation at high switching frequencies allows reduction of the size of magnetic components and capacitors in LLC resonant converters. However, a reduction of the magnetic component and capacitor sizes increases switching related loss and magnetic component losses, resulting in poor efficiency. Wide-band gap primary side switches, such as gallium nitride (GaN) field-effect transistors (FETs), can be used with lower output capacitance and gate charge to mitigate circulating current loss and gate driving loss to facilitate operation at higher switching frequencies. However, magnetics used for LLC resonant converters remain a limitation to increased converter efficiency due to core loss and winding loss, particularly at high switching frequencies.

Examples disclosed herein include improved integrated magnetic circuits using field-effect transistors (FETs) (e.g., GaN FETs, Silicon (Si) FETs, etc.) to reduce magnetic losses and minimize a transformer size for high-switching frequency operations (e.g., 500 kHz switching operations, 1 MHz switching operations, etc.). For example, GaN FETs can significantly reduce gate driving loss and required circulating current with characteristics of low output capacitance and low gate charge, which enables higher switching frequencies for LLC resonant converters and a reduction in the size of corresponding magnetic components and capacitors. However, magnetic component losses, including core loss and winding loss, are increased with higher switching frequency.

Examples disclosed herein include transformers using synchronous rectifier (SR) FETs and output capacitors integrated with output windings to minimize alternating current (AC) termination losses (e.g., to reduce a parasitic effect resulting from high-frequency operations of the LLC integrated transformer). For example, SR FET devices may be mounted on the printed circuit board (PCB) structure to reduce secondary side winding loss and terminal loss, which can dramatically reduce the winding loss caused by leakage flux.

Examples disclosed herein include an LLC converter with integrated transformer to reduce magnetic losses and converter size. In some disclosed examples, the integrated transformer uses a winding structure conforming to an approximate shape of an infinity symbol (∞) and referred to herein as an infinity winding structure, an infinity winding pattern, or an infinity winding arrangement. For example, the integrated transformer may have an infinity symbol shaped winding structure to reduce a required magnetic effect area to perform a high-frequency switching operation.

FIG. 1 depicts a power conversion system implemented as an LLC resonant converter 100 including an integrated LLC transformer magnetic circuit 102. The converter 100 of FIG. 1 includes a first input node 104 and a second input node 106 that receive an input voltage signal Vin 108. The input voltage signal Vin 108 of FIG. 1 is a DC voltage that is positive at the first input node 104 relative to the second input node 106 or the reference node 106, and the second input node 106 can be a ground or other reference voltage connection.

In the illustrated example of FIG. 1, the converter 100 includes a switching circuit 110 that provides an alternating voltage VSW 111 at a switching node 112. The switching circuit 110 of FIG. 1 implements a single-channel GaN power stage (e.g., Texas Instruments LMG3410 or similar). Alternatively, any other type of switching circuit may be used. The switching circuit 110 of FIG. 1 includes an input capacitor Ci 114 connected, or coupled (e.g., electrically coupled, physically coupled, etc., and/or a combination thereof) between the first and the second input nodes 104, 106. The switching circuit 110 of FIG. 1 includes a first switch 116, or a primary side transistor Q1 116, coupled between the first input node 104 and the switching node 112. The switching circuit 110 of FIG. 1 also includes a second switch 118, or a primary side transistor Q2 118, coupled between the second input node 106 and the switching node 112. The transistors 116, 118 of the example of FIG. 1 are n-channel GaN FETs. For example, the GaN FETs can conduct reverse current under three-quadrant mode operation. Alternatively, the example transistors 116, 118 may be different types of FETs (e.g., Si FETS), bipolar transistors, or other semiconductor-based switches. For example, if the transistors 116, 118 are not GaN FETs, the transistors 116, 118 may include body diodes and gate control terminals.

In the illustrated example of FIG. 1, the first transistor Q1 116 includes (1) a first drain 120 coupled to the first input node 104 and (2) a first source 122 coupled to the switching node 112. The second transistor Q2 118 of FIG. 1 includes (1) a second drain 124 coupled to the first input node 104 and (2) a second source 126 coupled to the switching node 112. The example switches Q1 116 and Q2 118 operate according to switching control signals SCP1 128 and SCP2 130, respectively, to alternately connect the switching node 112 to the first input node 104 (e.g., Q1 116 is on when SCP1 128 is active high) or to connect the switching node 112 to the second input node 106 (e.g., Q2 118 is on when SCP2 130 is active high).

In the illustrated example of FIG. 1, a series circuit 131 is also coupled between the switching node 112 and the second input node 106. The series circuit 131 includes an integer number (N) of transformer primary circuits 144a, 148a, or transformer primary windings 144a, 148a, where N is greater than 1. As depicted in FIG. 1, N=4, where two transformer primary windings 144a, 148a are shown, and two transformer primary windings are not shown. In the illustrated example, the series circuit 131 includes a capacitor Cr 132 with a corresponding resonant capacitor voltage Vcr 133, an inductor Lr 134 with an inductor winding LW, and two transformer primary windings 144a, 148a coupled in series, or connected in series, between the switching node 112 and the second input node 106. In the illustrated example, the primary windings 144a, 148a provide a corresponding primary winding inductance Lm 144b, 148b (e.g., an equivalent magnetics inductance). Although the primary winding inductances Lm 144b, 148b are depicted as separate windings, they are not physical windings but a representation of an equivalent magnetics inductance of the primary windings 144a, 148a. In the configuration of FIG. 1, the capacitor Cr 132 is coupled between the switching node 112 and the inductor Lr 134, and the inductor Lr 134 is coupled between the capacitor Cr 132 and a first node 136. The current that flows through Lr 134 is denoted by ip.

In the illustrated example of FIG. 1, the converter 100 with the integrated LLC transformer magnetic circuit 102 is formed as a stack structure 138. The stack structure 138 of FIG. 1 is formed by cells 140a, 140b that individually include a core structure 142a, 142b and associated windings. For example, the stack structure 138 may be implemented using a U-shaped core, which includes two cores, or legs, as described below in connection with FIG. 2C. For example, a first leg of the U-shaped core may be a first core, and a second leg of the U-shaped core may be a second core, where the first and the second cores are separated by an air gap. In such an example, the air gap may include the four cells 140a, 140b of FIG. 1 implemented by four PCB winding structures stacked on top of one another, where each PCB winding structure is coupled to the first and the second legs. Although there are only two transformer cells 140a, 140b and two corresponding core structures 142a, 142b depicted in FIG. 1, in this example, there are four cells. Alternatively, the example converter 100 may include fewer or more than four cells. The individual cells 140*a*, 140*b* of FIG. 1 may include further circuit components, such as capacitors and/or transistors to provide another example integrated magnetic circuit for the power converter 100.

The example stack structure 138 of FIG. 1 includes four transformer cells 140*a*, 140*b* (two transformer cells are not shown). The converter 100 of FIG. 1 includes N=4 core structures 142*a-b*. In some examples, the core structures 142*a-b* are implemented as PCB structures (e.g., a single-layer PCB board, a multi-layer PCB board, etc.). As used herein, the term "core structure" and "transformer core structure" are used interchangeably and refer to an electrical circuit including one or more transformer windings that are wound and/or otherwise formed around one or more cores of a transformer (e.g., wound around one or both legs of a U-shaped transformer). The transformer core structures 142*a-b* are arranged in a stacked configuration forming the stack structure 138. The first four example core structures 142*a-b* are transformer core structures. Associated primary and secondary windings are wound or otherwise formed around at least a portion of a corresponding one of the cores of the transformer 102. The stack structure 138 of FIG. 1 provides a single magnetic circuit to magnetically couple transformer primary circuits 144*a*, 148*a*, transformer secondary circuits 149, 151, and the resonant inductor Lr 134. The stack structure 138 of FIG. 1 advantageously provides complete or at least partial flux cancellation to enhance thermal efficiency in a compact high-power density integrated magnetic circuit.

The first node 136 of FIG. 1 is coupled to a first primary winding P1 144*a* of the first transformer cell 140*a*. The first example primary winding 144*a* is coupled to provide the first primary winding inductance Lm 144*b* between the first node 136 and a second node 146.

The second and third example transformer cells of the stack structure 138 are not shown. The second example transformer cell of the example stack structure 138 includes a second primary winding P2 corresponding to a second primary winding inductance Lm. The third example transformer cell of the example stack structure 138 includes a third primary winding P3 corresponding to a third primary winding inductance Lm.

The fourth example transformer cell 140*b* of the example stack structure 138 includes a fourth example primary winding P4 148*a*. The fourth example primary winding 148*a* is coupled to provide a fourth example primary winding inductance Lm 148*b* between a third node 150 and the second input node 106.

In the illustrated example of FIG. 1, the series resonant circuit 131 connects the resonant capacitor Cr 132, the resonant inductor Lr 134, and the transformer primary windings P1-P4 144*a*, 148*a* (and equivalent primary winding inductances Lm 144*b*, 148*b*) in a series circuit between the switching node 112 and the second input node 106. Alternatively, the example primary windings P1-P4 144*a*, 148*a*, the example resonant capacitor Cr 132, and the example resonant inductor Lr 134 may be coupled in any order in a series circuit between the first and the second input nodes 104, 106. Alternatively, the example individual transformer circuits 140*a*, 140*b* can include multiple series and/or parallel coupled primary windings, and the primary windings of the individual transformer circuits 140*a*, 140*b* may be coupled in series with one another.

In the illustrated example of FIG. 1, each of the individual transformer cells 140*a*, 140*b* includes a transformer secondary circuit including one or more secondary windings formed around the corresponding cores of the stack structure 138. For example, each of the secondary windings may be coupled, wound, or otherwise formed around each one of the legs of the U-shaped core (e.g., the transformer 102 of FIG. 1). The example of FIG. 1 provides two secondary windings wound or otherwise formed around the corresponding cores of the transformer 102. In the illustrated example, the first winding structure 142*a*, or PCB structure 142*a*, includes a first secondary winding S1 152*a* and a second secondary winding S2 152*b*. For example, the first winding structure 142*a* may be formed around each of the legs, or supports, of the U-shaped core.

The second core structure (not shown) of the stacked structure 138 includes a third secondary winding S3 and a fourth secondary winding S4. The third core structure (not shown) of the stacked structure 138 includes a fifth secondary winding S5 and a sixth secondary winding S6.

The fourth core structure 142*b* of FIG. 1 includes a seventh secondary winding S7 154*a* and an eighth secondary winding S8 154*b*. Alternatively, one or more of the example core structures 142*a*, 142*b* may use a single secondary winding or more than two secondary windings. Each one of the example transformer secondary windings S1-S8 152*a-b*, 154*a-b* include first and second ends. The first ends of the secondary windings S1-S8 152*a-b*, 154*a-b* are coupled to one another and to a first converter output 156.

The transformer cells 140*a*, 140*b* of FIG. 1 include a secondary transistor such as a synchronous rectifier (SR) transistor coupled in series with the corresponding transformer secondary windings S1-S8 152*a-b*, 154*a-b* between the first converter output 156 and a second converter output 158, or at least one rectifier diode (not shown). For example, as depicted in FIG. 1, the first transformer cell 140*a* includes (1) a first SR transistor SR1 160 coupled in series with S1 152*a* and (2) a second SR transistor SR2 162 coupled in series with S2 152*b*.

The second transformer cell (not shown) includes a third SR transistor SR3 coupled in series with the third secondary winding S3 and a fourth SR transistor SR4 coupled in series with the fourth secondary winding S4. The third transformer cell (not shown) includes a fifth SR transistor SR5 coupled in series with the fifth secondary winding S5 and a sixth SR transistor SR6 coupled in series with the sixth secondary winding S6.

Further, as depicted in FIG. 1, the fourth transformer cell 140*b* includes (1) a seventh SR transistor SR7 164 coupled in series with S7 154*a* and (2) an eighth SR transistor SR8 166 coupled in series with S8 154*b*. In the illustrated example, the first through the eighth SR transistors SR1-SR8 160, 162, 164, 166 are n-channel FETs individually coupled between the corresponding secondary windings S1-S8 152*a-b*, 154*a-b* and the first converter output 156. Alternatively, one or more of the first through the eighth example SR transistors SR1-SR8 160, 162, 164, 166 may be any other type of semiconductor-based secondary transistor switch.

In some examples, the secondary circuits 149, 151 included in the example transformer cells 140*a*, 140*b* include one secondary winding and four SR FETs forming a full bridge rectifier structure. In other examples, the secondary circuits 149, 151 included in the example transformer cells 140*a*, 140*b* include one or more secondary windings and one or more rectifier diodes (not shown).

In operation of the example converter 100, the secondary circuits 149, 151 individually rectify corresponding AC secondary signals (e.g., currents and voltages) to provide a DC output voltage Vo at the converter outputs 156, 158. The converter 100 of FIG. 1 includes an output capacitor Co 168 coupled between the converter outputs 156, 158. The first secondary circuit 149 includes the secondary transistors SR1 160 and SR 2 162 operated according to corresponding switching control signals SCS1 170 and SCS2 172, as well as a first cell output capacitor C1 174 and a second cell output capacitor C2 176. Each of the secondary circuits 149, 151 further includes a diode 178a-d (e.g., a kickback diode, a suppression diode, a clamp diode, etc.).

The other example secondary circuits of the converter 100 of FIG. 1 are similarly configured as depicted in FIG. 1. The second secondary circuit of FIG. 1 (not shown) includes transistors SR3 and SR4 operated according to corresponding switching control signals SCS3 and SCS4, as well as output capacitors C3 and C4. The second secondary circuit of FIG. 1 is located after a fourth node 179, but before a fifth node 181. The third secondary circuit of FIG. 1 (not shown) includes transistors SR5 and SR6 operated according to corresponding switching control signals SCS5 and SCS6, as well as output capacitors C5 and C6. The third secondary circuit of FIG. 1 is located after the fourth node 179, but before the fifth node 181. Alternatively, if only two cells 140a-b are used, then the break between the fourth and fifth nodes 179, 181 may be closed and, thus, the two cells 140a-b may be coupled in series.

The fourth secondary circuit of FIG. 1 includes the secondary transistors SR7 164 and SR8 166 operated according to corresponding switching control signals SCS1 180 and SCS8 182, as well as output capacitors C7 184 and C8 186. Each one of the secondary circuit output capacitors C1-C8 174, 176, 184, 186 are coupled between the converter outputs 156, 158. Each one of the secondary circuit secondary transistors SR1-SR8 160, 162, 164, 166 are individually coupled between the second end of the corresponding secondary winding and the second converter output 158.

For example, SR1 160 is coupled between the second end of the first secondary winding S1 152a and the second converter output 158.

In the illustrated example of FIG. 1, the power conversion system 100 includes a primary controller 188. The primary controller 188 of FIG. 1 implements a control circuit or a driver circuit (e.g., Texas Instruments UCD3138, UCD 3138A, etc.). The example primary controller 188 includes a first set of outputs 190, which provide the primary switching control signals SCP1 128 and SCP2 130 to alternately turn Q1 116 and Q2 118 on and off. By alternately turning Q1 116 and Q2 118 on and off, the example primary controller 188 alternately couples the switching node 112 to the input nodes 104, 106 to provide AC signals to the transformer primary windings P1-P4 144a, 148a. Although the example primary controller 188 is depicted as a single device, the primary controller 188 may be implemented by two or more controller chips or controller circuits.

The primary controller 188 of FIG. 1 further includes a second set of outputs 192 electrically in circuit with the secondary transistors SR1-SR8 160, 162, 164, 166 via a secondary controller 194. The secondary controller 194 of FIG. 1 implements a low-side power MOSFET driver (e.g., Texas Instruments UCD 7138 or similar). For example, the primary controller 188 may coordinate or direct the operation of the secondary controller 194 to generate the second set of outputs 192 to achieve synchronous-rectification control of SR1-SR8 160, 162, 164, 166. Alternatively, the example second set of outputs 192 may be omitted if the example secondary transistors SR1-SR8 160, 162, 164, 166 are replaced with secondary side rectifier diodes. The second set of outputs 192 of FIG. 1 provide the secondary switching control signals SCS1-SCS8 to alternately turn SR1-SR8 160, 162, 164, 166 on and off. By alternately turning SR1-SR8 160, 162, 164, 166 on and off, the example controllers 188, 194 alternately rectify the AC signals from the secondary circuits 149, 151 to provide the DC output voltage signal Vo at the converter outputs 152, 154. Although the example secondary controller 194 is depicted as a single device, the secondary controller 194 may be implemented by two or more controller chips or controller circuits.

In some examples, the first and the second sets of switching control signals (SCP1-SCP2 128, 130, SCS1-SCS8 170, 172, 180, 182) are synchronized. In some examples, the controllers 188, 194 operate in a closed-loop manner to regulate the output voltage signal Vo based on one or more feedback signals and a desired output signal or set point. For example, as depicted in FIG. 1, the primary controller 188 can receive (1) an output voltage feedback signal Vo (e.g., from the first converter output 156 with respect to a reference voltage or ground voltage at the second converter output 158), and (2) an output current feedback signal iload. The example of FIG. 1 includes a current sensor 196 associated with the second output node 158 to provide the output current feedback signal iload. The current sensor 196 of FIG. 1 uses low-side output current sensing. Alternatively, the example current sensor 196 may use any other type of current sensing. Alternatively, different sensing configurations and feedback circuitry may be used than those described above in connection with FIG. 1.

Figure 2A:
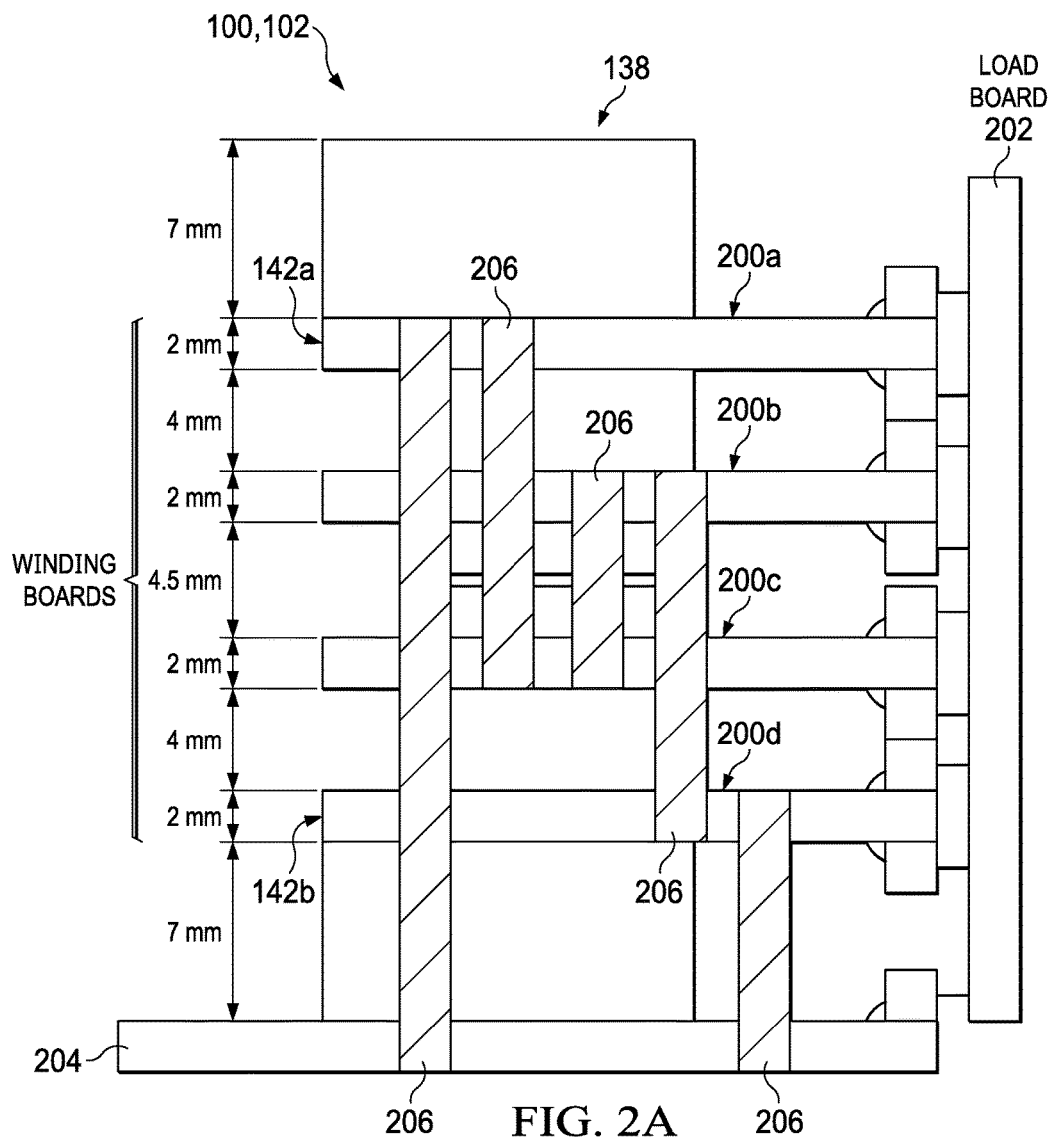
FIG. 2A is a side view of an example implementation of the example LLC resonant converter with the example integrated LLC transformer magnetic circuit of FIG. 1.
Figure 3A:
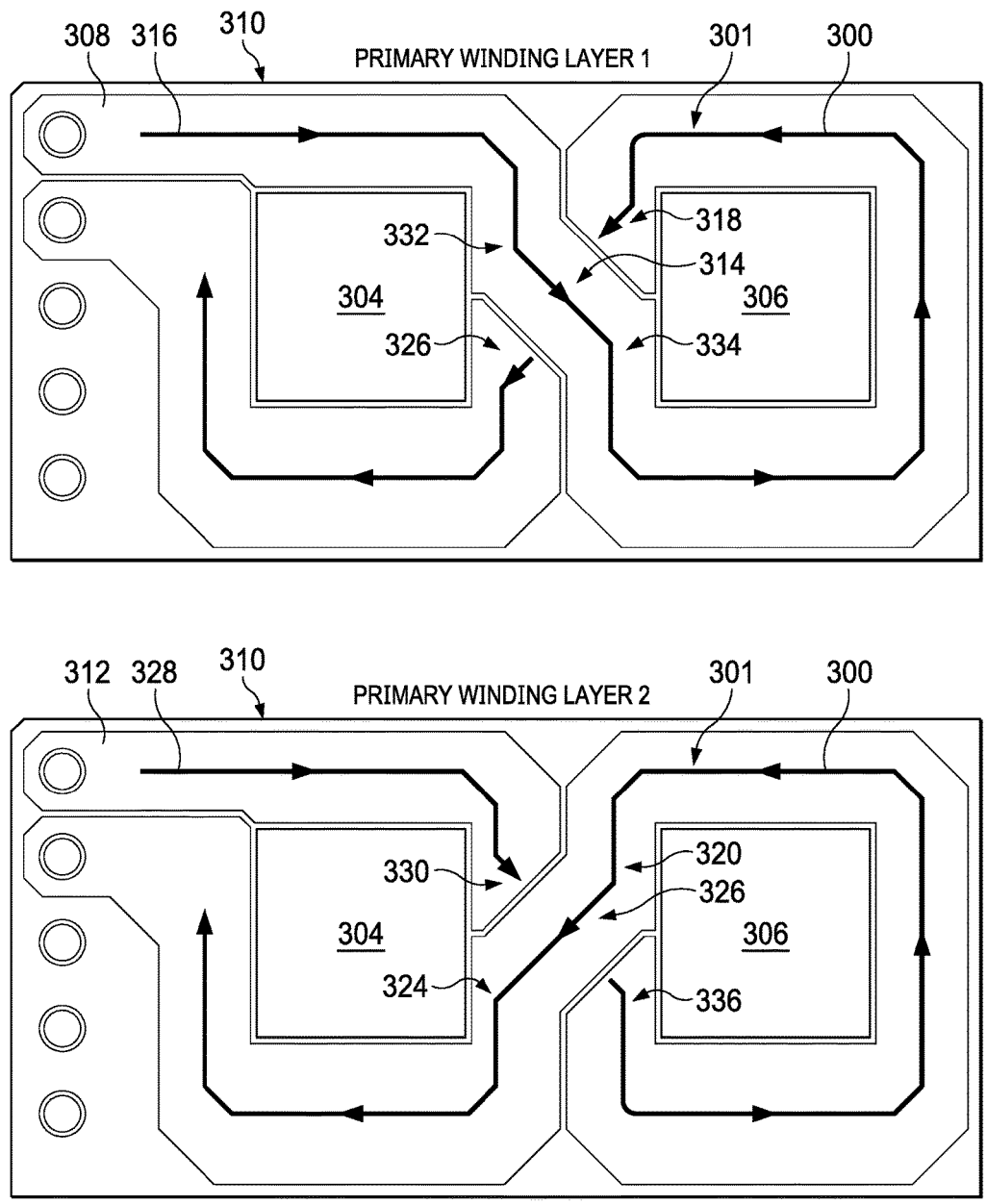
FIG. 3A depicts a plan view of a first layer of an example primary winding formed as conductive structures included in a multi-layer printed circuit board and a plan view of a second layer of the example primary winding.
Figure 3B:
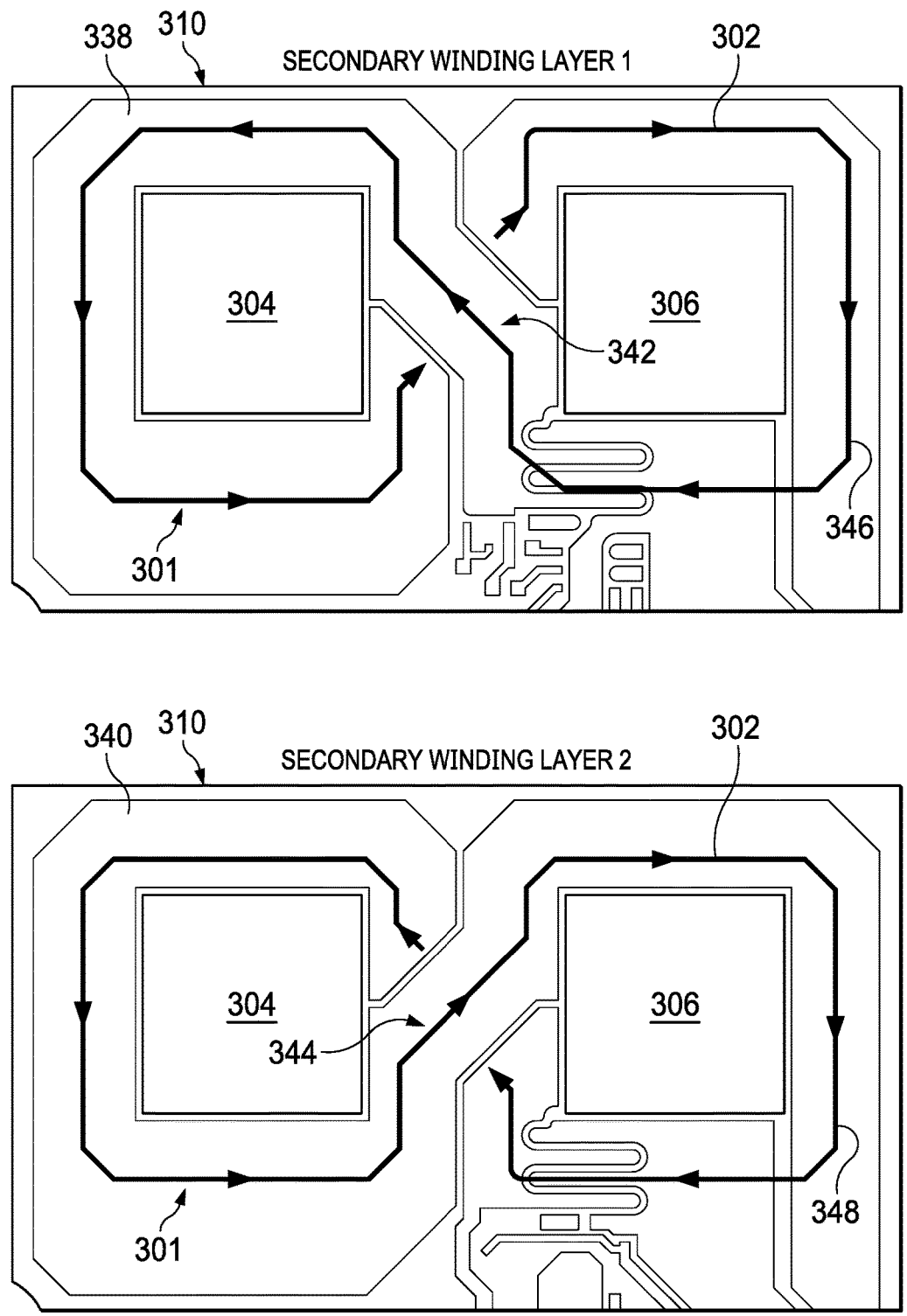
FIG. 3B depicts a plan view of a first layer of an example secondary winding formed as conductive structures included in a multi-layer printed circuit board and a plan view of a second layer of the example secondary winding.
Figure 9:
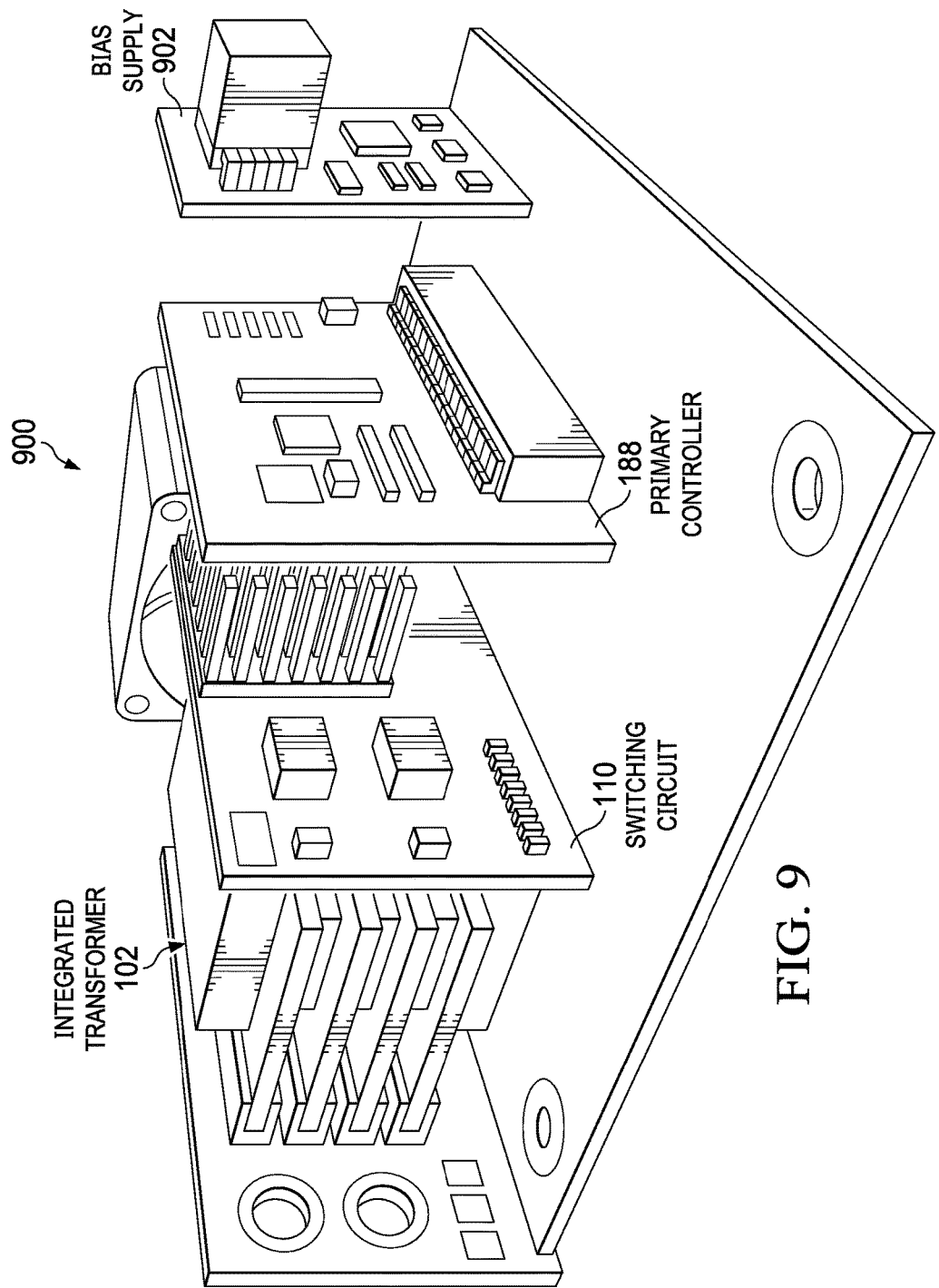
FIG. 9 is a perspective view of an example implementation of the example LLC resonant converter with the integrated LLC transformer of FIG. 1.

FIG. 2A is a side view of an example implementation of the example LLC resonant converter 100 with the integrated LLC transformer magnetic circuit 102 of FIG. 1. The converter 100 of FIG. 2A depicts the stack structure 138 of FIG. 1, which includes and/or otherwise implements a "U" shaped magnetic core design with "∞" shaped winding structure as depicted in FIGS. 3A-3B and FIG. 9. The example integrated LLC transformer 102 of FIG. 2A, includes four example PCB winding boards 200a-d (e.g., PCB structures 200a-d), an example load board 202, and a main board 204. Each one of the example winding boards 200a-d have a turn ratio of 1:1. Alternatively, other turn ratios may be used. Each one of the example PCB winding boards 200a-d includes a primary winding, or a primary winding layer, and two secondary windings, or two secondary winding layers, in a sandwich structure. The example winding boards 200a-d are interconnected via connectors 206. The example stack structure 138 includes the four PCB winding boards 200a-b and the corresponding connectors 206.

In the illustrated example of FIG. 2A, the winding boards 200a-d implement the transformer cells 140a, 140b of FIG. 1. For example, the first winding board 200a may implement the first transformer cell 140a and the fourth winding board 200d may implement the fourth transformer cell 140b of FIG. 1. For example, the first winding board 200a may implement the core structure 142a of FIG. 1 and the transformer secondary circuit 149 of FIG. 1. The example winding boards 200a-d of FIG. 2A are mechanically mounted in the stack structure 138 using adhesive (not shown). For example, the transformer and inductor cells may be glued together, with or without gaps between the adjacent core structures 142a-b. Alternatively, the example winding boards 200a-d may be mounted using mechanical mounting structures.

Figure 2B:
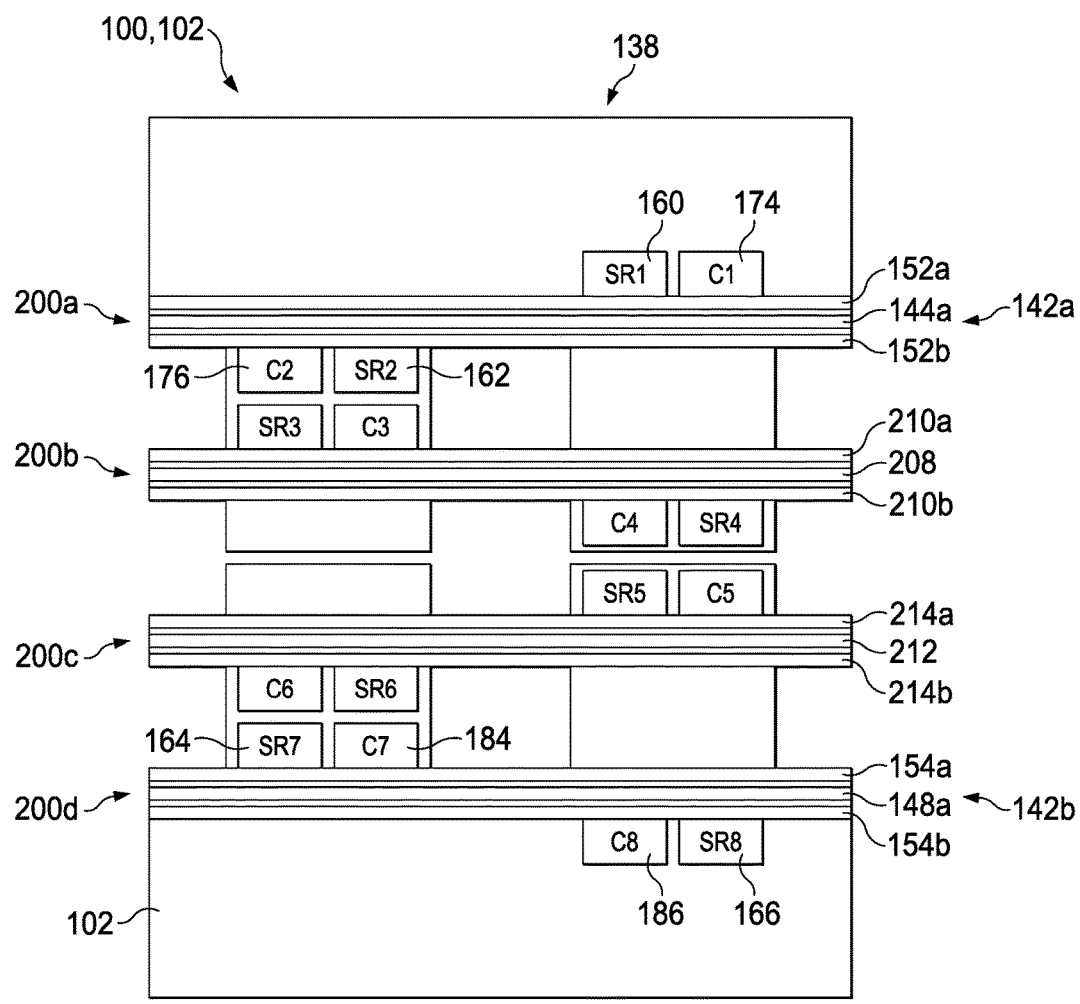
FIG. 2B is a front view of the example implementation of FIG. 2A of the example LLC resonant converter with the example integrated LLC transformer magnetic circuit of FIG. 1.

Each of the PCB winding boards 200a-d of FIG. 2A maintains a distance from each other to allow clearance for the SR FETs and output capacitors as depicted in FIG. 2B, which improves the thermal performance of the power conversion system 100. In addition, the second and third example PCB winding boards 200b-c naturally keep distance from the air gap resulting in very low fringing loss. For example, as depicted in FIG. 2A, there are four millimeters between the first and the second winding boards 200a-b. Alternatively, any other distance may be used between pairs of winding boards 200a-d. In addition, although other distances and thicknesses of the example winding boards 200a-d are depicted in FIG. 2A for reference, any other distance or thickness values may be used.

In the illustrated example of FIG. 2A, the primary windings of the four example winding boards 200a-d are series-connected, or series-coupled. The secondary windings of the four example winding boards 200a-d are parallel-connected, or parallel-coupled, to get equivalent of a 4:1 turns ratio. The secondary side windings of the example winding boards 200a-d are integrated with SR FETs and output capacitors as depicted in FIG. 2B. Accordingly, there are no AC terminations on the secondary side and the termination loss can be reduced. In addition, the example transformer winding structure, including the primary and the secondary windings of the four example winding boards 200a-d, are interwoven to reduce winding loss.

FIG. 2B is a front view of the example implementation of FIG. 2A of the example LLC resonant converter 100 with the example integrated LLC transformer magnetic circuit 102 of FIG. 1. The first example PCB winding board 200a of FIG. 2B includes the first primary winding P1 144a of FIG. 1. The first example PCB winding board 200a of FIG. 2B further includes the first secondary winding S1 152a and the second secondary winding S2 152b of FIG. 1.

In the illustrated example of FIG. 2B, the second example PCB winding board 200b of FIG. 2B includes a second primary winding layer 208, which corresponds to the second primary winding P2 as described above in connection with FIG. 1. The second example PCB winding board 200b of FIG. 2B includes a third and a fourth secondary winding layer 210a-b, which correspond to the third and fourth secondary windings S3 and S4 as described above in connection with FIG. 1. Moreover, the third example PCB winding board 200c of FIG. 2B includes a third primary winding layer 212, which corresponds to the third primary winding P3 as described above in connection with FIG. 1. The third example PCB winding board 200c of FIG. 2B includes a fifth and sixth secondary winding layer 214a-b, which correspond to the fifth and sixth secondary windings S5 and S6 as described above in connection with FIG. 1.

In the illustrated example of FIG. 2B, the fourth example PCB winding board 200d of FIG. 2B includes the fourth primary winding P4 148a of FIG. 1. The fourth example PCB winding board 200d of FIG. 2B further includes the seventh secondary winding S7 154a and the eighth secondary winding S8 154b of FIG. 1.

The transformer windings of the example PCB winding boards 200a-d of FIG. 2B can be any suitable conductive structures that are wound or otherwise extend around the legs of the U-shaped core to provide transformer operation and to create the resonant inductor Lr 134 of FIG. 1. The stack structure 138 of FIG. 2B is a vertical stack structure, with the fourth core 142b on the bottom, and where each of the cores 142a-b of FIG. 1 face upward along the illustrated vertical direction. The transformer primary windings P1-P4 144a, 148a, and secondary windings S1-S8 152a-b, 154a-b included in the example PCB winding boards 200a-d are formed as conductive structures, such as traces on or in a transformer cell PCB of the corresponding transformer cell, where the conductive structures are wound and/or otherwise formed around one or more cores of the transformer 102. For example, the conductive structures of a given transformer cell such as the first transformer cell 140a may be formed on a single corresponding multi-layer PCB with different layers for the different windings as depicted in FIG. 2B. In some examples, the number and nature of the conductive structures can be tailored to provide any desired primary-to-secondary transformer turns ratio, and the conductive structures forming the windings can be sized to support any desired level of primary and secondary circuit current flow for a given end-use application.

In the illustrated example of FIG. 2B, a use of PCB structures to implement the integrated LLC transformer magnetic circuit 102 of FIG. 1 enables compact integration of further circuit components in the stack structure 138. For example, as depicted in FIG. 2B, the secondary transistors SR1-SR8 160, 162, 164, 166 and the secondary capacitors C1-C8 174, 176, 184, 186 of FIG. 1 are mounted on the transformer cell PCB of the corresponding transformer cells 142a-b. The example arrangement of FIG. 2B allows normal PCB component mounting techniques and circuit board trace interconnections to connect the secondary transistors SR1-SR8 160, 162, 164, 166 in series with the corresponding transformer secondary winding. In the example of FIG. 2B, suitable connectors can be mounted to the cell circuit boards (not shown in FIG. 2B) to provide external connection from the secondary circuitry to the converter outputs 156, 158, as well as to facilitate connection for any included output capacitor (e.g., the output capacitor Co 168 of FIG. 1) and/or output current sensing components (e.g., current sensor 196 of FIG. 1) and output voltage sensing components (output current and voltage sensing components not shown in FIG. 2B).

In the illustrated example of FIG. 2B, the secondary capacitors C1-C8 174, 176, 184, 186 and the secondary transistors SR1-SR8 160, 162, 164, 166 are mounted on the top and bottom sides of the multi-layer PCB structures 152a-b, 210a-b, 214a-b, 154a-b to accommodate connections to the corresponding conductive structure forming the corresponding upper or lower secondary winding LW corresponding to the Lr 134 of FIG. 1. For example, as depicted in FIG. 2B, SR1 160 and C1 174 are mounted on the top side of the first secondary winding S1 152a. In another example, as depicted in FIG. 2B, SR2 162 and C2 176 are mounted on the bottom side of the second secondary winding S2 152b.

Figure 2C:
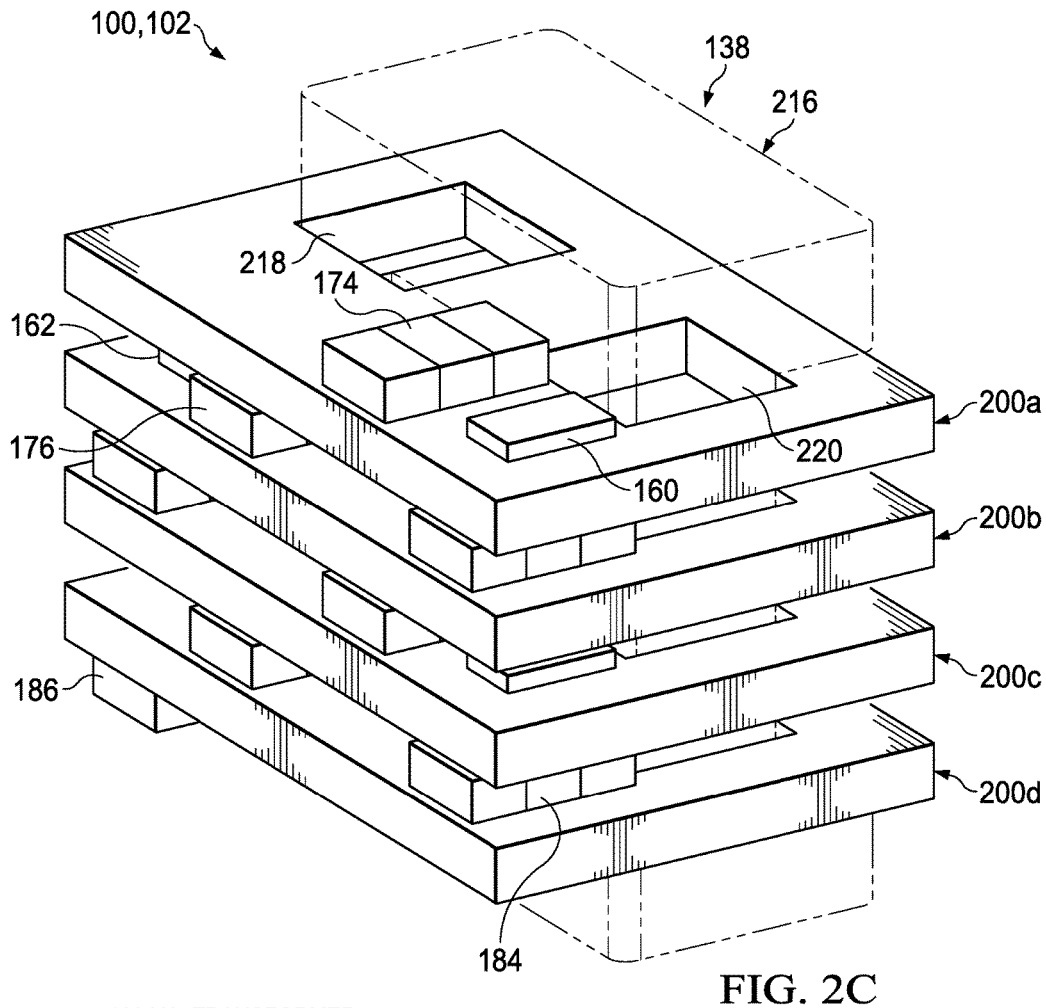
FIG. 2C is an isometric view of the example implementation of FIG. 2A of the example LLC resonant converter with the example integrated LLC transformer magnetic circuit of FIG. 1.

FIG. 2C is an isometric view of the example implementation of FIG. 2A of the example LLC resonant converter 100 with the example integrated LLC transformer magnetic circuit 102 of FIG. 1. In the illustrated example of FIG. 2C, the converter 100 depicts the stack structure 138 of FIG. 1, which includes and/or otherwise implements a "U" shaped magnetic core 216 with "∞" shaped winding structure as depicted in FIGS. 3A-3B and FIG. 9. The U-shaped magnetic core 216 of FIG. 2C includes two cores, 218, 220, or legs 218, 220. In the illustrated example, associated primary windings 144a, 148a, 208, 212, and secondary windings 152a-b, 154a-b, 210a-b, 214a-b, of the winding boards 200a-d of FIG. 2A are wound or otherwise formed around at least a portion of a corresponding one of the cores 218, 220 of the integrated transformer 102. For example, the first primary winding 144a may be wound and/or otherwise formed around both of the cores 218, 220 in an infinity ("∞") shaped winding arrangement 301 as described further below in accordance with FIGS. 3A-3B.

FIGS. 3A-3B depict plan views of example transformer winding structures 300, 302 formed as multi-turn conductive structures or traces on or in a PCB with "∞" shaped windings 301 that extend around outer legs 304, 306 of a U-shaped transformer core structure. For higher voltage applications (e.g., 48V DC output designs), conventional one-turn output winding designs require significant magnetic flux cross-sectional area $A_e$. As described below in Equation (1), for the same switching frequency $f_{sw}$ and change in magnetic field $\Delta B$, the required $A_e$ is proportional to the output voltage with one turn winding structure, and it is 4 times for 48V output design compared to 12V design with the same winding structure.

$$A_e = \frac{2V_o}{f_{sw}\Delta B} \qquad \text{Equation (1)}$$

With a very large $A_e$ magnetic core, the transformer design may not be optimized and/or otherwise improved using a one-turn winding design. The "∞" shaped winding structure 301 as depicted in FIGS. 3A-3B reduce core size and increase power density of the integrated LLC transformer magnetic circuit 102 of FIG. 1. The "∞" shaped winding structure 301 as depicted in FIGS. 3A-3B can utilize both of the legs 304, 306 of the U-shaped transformer core structure and the equivalent $A_e$ is doubled for secondary winding, since the flux goes through the "∞" shaped winding 301 twice.

FIG. 3A depicts a plan view of a first layer 308 of the example primary winding 300 formed as conductive structures included in a multi-layer PCB 310. For example, the first layer 308 may be the top surface of the multi-layer PCB 310 (e.g., an upward facing surface of the PCB 310). The multi-layer PCB 310 of FIG. 3A may implement the first example PCB winding board 200a of FIGS. 2A-2B. The example primary winding 300 of FIG. 3A may implement the first primary winding P1 152a of FIGS. 1 and/or 2B. In addition, FIG. 3A depicts a plan view of a second layer 312 of the example primary winding 300 included in the multi-layer PCB 310. The example second layer 312 of the example primary winding 300 of FIG. 3A is formed as conductive structures included in the PCB 310. For example, the second layer 312 may be the bottom surface of the multi-layer PCB 310 (e.g., a downward facing surface of the PCB 310).

In the illustrated example of FIG. 3A, the primary winding 300 has two layers. Alternatively, the example primary winding 300 may have a different number of layers. In operation, on the first layer 308 at a first intersection 314 of the "∞" winding 301, a forward current 316 leaves the first layer 308 at a first position 318 and enters the second layer 312 at a second position 320, where the second position 320 is the same position as the first position 318 but on a different layer of the primary winding 300. On the second layer 312, the forward current 316 crosses a second intersection 322 by traveling from the second position 320 to a third position 324. The forward current 316 leaves the second layer 312 and re-enters the first layer 308 at a fourth position 326.

Similarly, a reverse current 328 leaves the second layer 312 at a fifth position 330 and enters the first layer 308 at a sixth position 332. On the first layer 308, the reverse current 328 crosses the first intersection 314 by traveling from the sixth position 332 to a seventh position 334. The reverse current 328 leaves the first layer 308 and re-enters the second layer 312 at an eighth position 336. At the intersections 314, 322 of the "∞" winding 301, the forward current 316 and the reverse current 328 with perpendicular direction will go to different layers. However, at the non-intersecting parts of the "∞" winding 301 (e.g., the non-intersections of the "∞" winding 301), the two layers 308, 312 work as parallel windings to fully utilize the copper area of the multi-layer PCB 310 of FIG. 3A.

FIG. 3B depicts a plan view of a first layer 338 of the example secondary winding 302 formed as conductive structures included in the multi-layer PCB 310. The example secondary winding 302 of FIG. 3B may implement the first secondary winding S1 152a of FIGS. 1 and/or 2B. In addition, FIG. 3B depicts a plan view of a second layer 340 of the example secondary winding 302 included in the multi-layer PCB 310.

The operation of the example secondary winding 302 of FIG. 3B is substantially similar to that of the example primary winding 300 as described above in connection with FIG. 3A. For example, at intersections 342, 344 of the "∞" winding 301, a forward current 346 and a reverse current 348 with perpendicular direction go to different layers and at the other parts of the "∞" winding 301, the two layers 338, 340 work as parallel windings to fully utilize the copper area of the multi-layer PCB 310. The two-layer design of the example primary winding 300 and the example secondary winding 302 improves a current handling capability of the power conversion system 100 of FIG. 1 by improving thermal performance. Alternatively, the example primary winding 300 and the example secondary winding 302 of FIGS. 3A-3B may be implemented using one or more than two layers.

Figure 4:
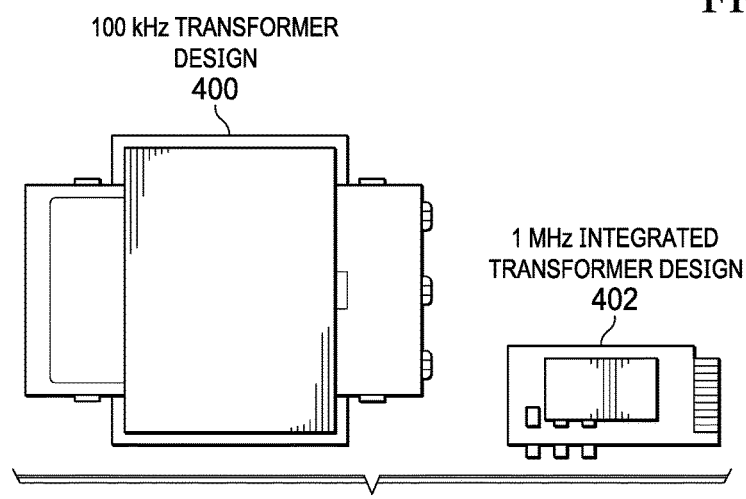
FIG. 4 depicts a comparison between a first example transformer design corresponding to a first example switching frequency and a second example transformer design corresponding to a second example switching frequency.

FIG. 4 depicts a comparison between a first example transformer design 400 corresponding to a first example switching frequency and a second example transformer design 402 corresponding to a second example switching frequency. In the illustrated example of FIG. 4, the first example transformer design 400 is a 48V DC output transformer capable of a switching frequency of 100 kilohertz (kHz). In the illustrated example of FIG. 4, the second example transformer design 402 is a 48V DC output transformer capable of a switching frequency of 1 megahertz (MHz). The second example transformer design 402 of FIG. 4 includes the LLC resonant converter 100 with the integrated LLC transformer magnetic circuit 102 of FIG. 1, which includes the SR FETs SR1-SR8 160, 162, 164, 166 of FIG. 1, the output capacitors C1-C8 174, 176, 184, 186 of FIG. 1. The second example transformer design 402 of FIG. 4 further includes the primary windings P1-P4 144a, 148a and the secondary windings S1-S8 152a-b, 154a-b implemented using the "∞" shaped winding structure as described above in connection with FIGS. 3A-3B. As depicted in FIG. 4, the second example transformer design 402 is substantially smaller (e.g., approximately six times smaller) compared to the first example transformer design 400.

Figure 5:
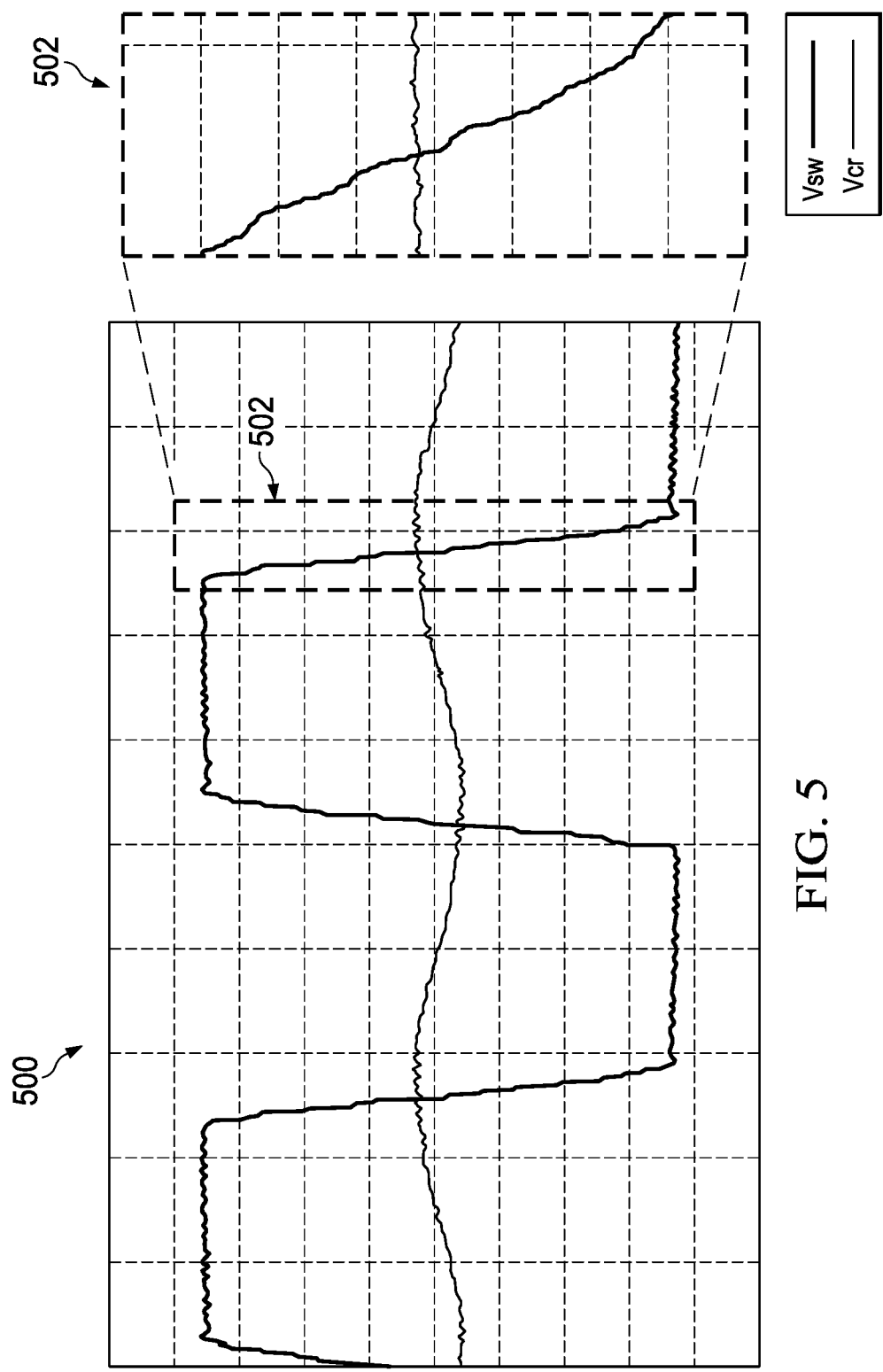
FIG. 5 depicts example waveforms corresponding to an operation of the example LLC resonant converter with the example integrated LLC transformer of FIG. 1.

FIG. 5 depicts example waveforms 500 corresponding to an operation of the example LLC resonant converter 100 with the example integrated LLC transformer 102 of FIG. 1. In the illustrated example of FIG. 5, the example waveforms 500 depict experimental waveforms of the switching node voltage Vsw 111 of the primary transistors 116, 118 of FIG. 1, and the resonant capacitor voltage Vcr 133 of the resonant capacitor Cr 132 of FIG. 1. The waveforms 500 of FIG. 5 depict an approximate rise and fall time of the Vsw 111 of 100 nanoseconds with an approximate 2 Amp peak magnetizing current. Zooming in on a dead time region 502, the rising and falling edge of the Vsw 111 depicts high frequency ripple. The high frequency ripple or resonance of the example of FIG. 5 may be caused by parasitic capacitance of the integrated LLC transformer 102, output capacitance of the primary transistors 116, 118, output capacitance of the secondary transistors 160, 162, 164, 166, etc., and/or a combination thereof.

Figure 6A:
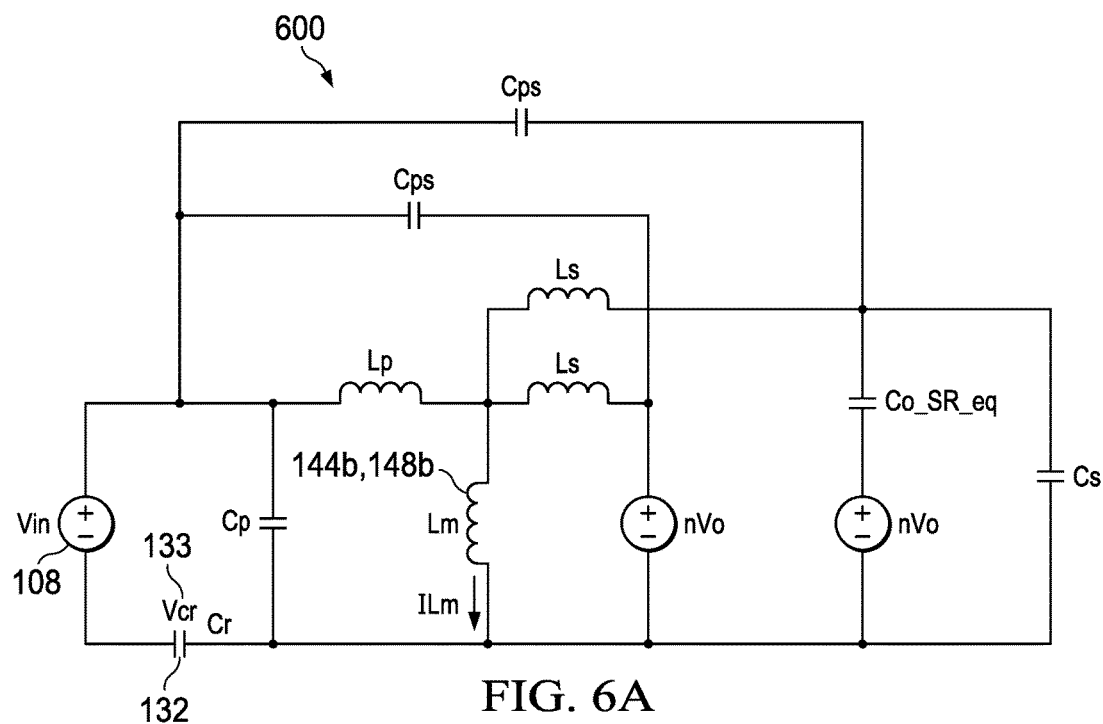
FIG. 6A is a schematic illustration of an example equivalent circuit of an example LLC resonant transient with high-side device turn-on corresponding to the example LLC resonant converter with the integrated LLC transformer of FIG. 1.
Figure 6B:
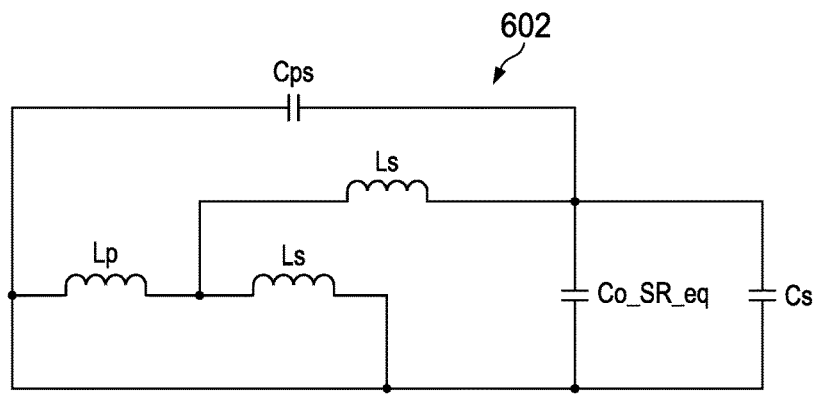
FIG. 6B is a schematic illustration of a circuit corresponding to a simplification of the equivalent circuit of FIG. 6A.

FIG. 6A is a schematic illustration of an example equivalent circuit 600 of an example LLC resonant transient with high-side device turn-on corresponding to the example LLC resonant converter 100 with the integrated LLC transformer 102 of FIG. 1. FIG. 6B is a schematic illustration of a circuit 602 corresponding to a simplification of the equivalent circuit 600 of FIG. 6A.

Figure 7A:
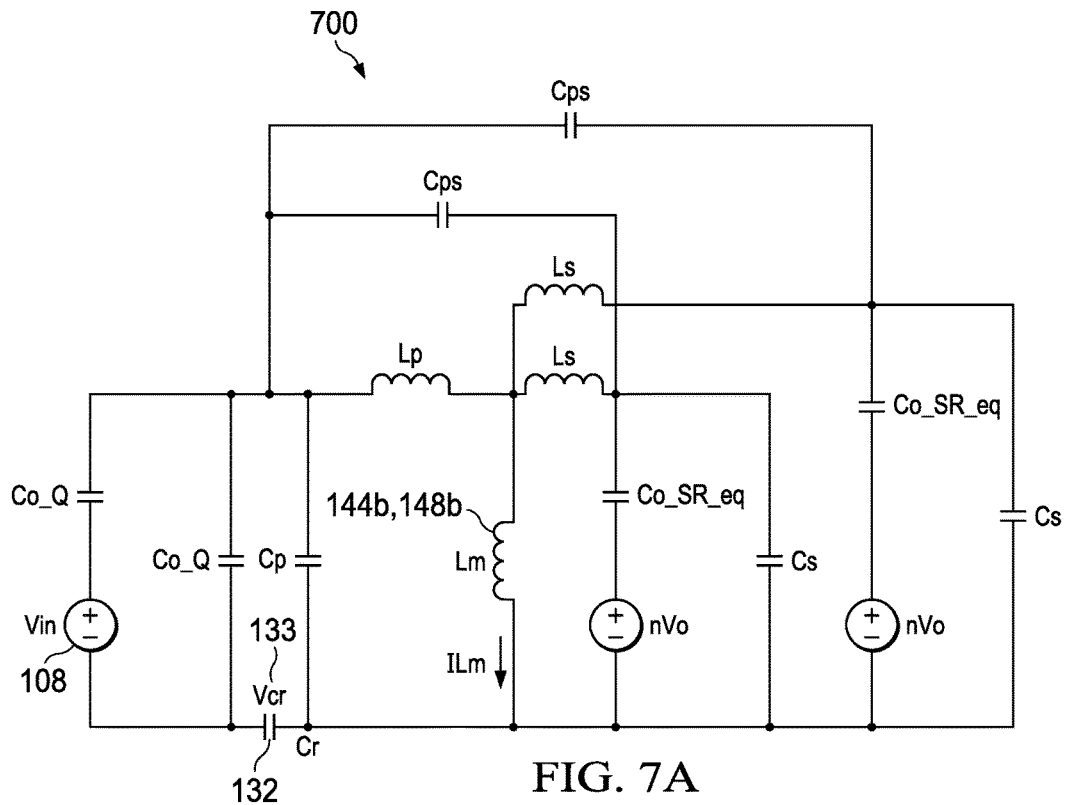
FIG. 7A is a schematic illustration of an example equivalent circuit of an example LLC deadtime transient with both high-side and low-side device turn-off corresponding to the example LLC resonant converter with the integrated LLC transformer of FIG. 1.
Figure 7B:
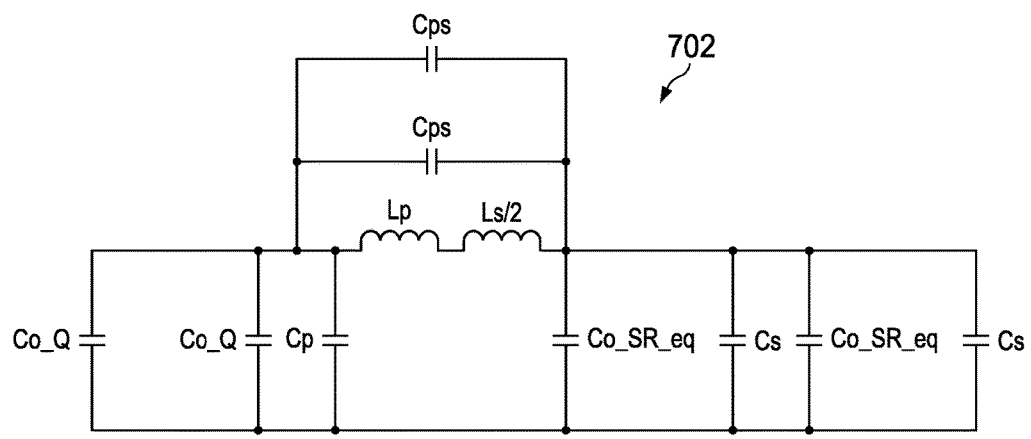
FIG. 7B is a schematic illustration of a circuit corresponding to a simplification of the equivalent circuit of FIG. 7A.

FIG. 7A is a schematic illustration of an example equivalent circuit 700 of an example LLC deadtime transient with both high-side and low-side devices turn-off corresponding to the example LLC resonant converter 100 with the integrated LLC transformer 102 of FIG. 1. FIG. 7B is a schematic illustration of a circuit 702 corresponding to a simplification of the equivalent circuit 700 of FIG. 7A.

In the illustrated example of FIGS. 6A-6B and 7A-7B, $C_{o\_SR\_eq}$ corresponds to the reflected output capacitance of the primary transistors Q1 116 and Q2 118 at the input side of the converter 100 of FIG. 1. In the illustrated example of FIGS. 6A-6B and 7A-7B, $C_p$ and $C_s$ are transformer self-winding capacitances, $C_{ps}$ is a transformer inter-winding capacitance, and $L_p$ and $L_s$ are transformer primary and reflected secondary leakage inductances.

In the illustrated examples of FIGS. 6A and 7A, for high-frequency resonance, the $C_r$ 132 and voltage source can be considered a short circuit and $L_m$ can be considered an open circuit. In response to the high-frequency resonance, the equivalent circuit 600 of FIG. 6A can be further simplified into the circuit 602 as depicted in FIG. 6B. Similarly, in response to the high-frequency resonance, the equivalent circuit 700 of FIG. 7A can be further simplified into the circuit 702 as depicted in FIG. 7B.

Figure 8:
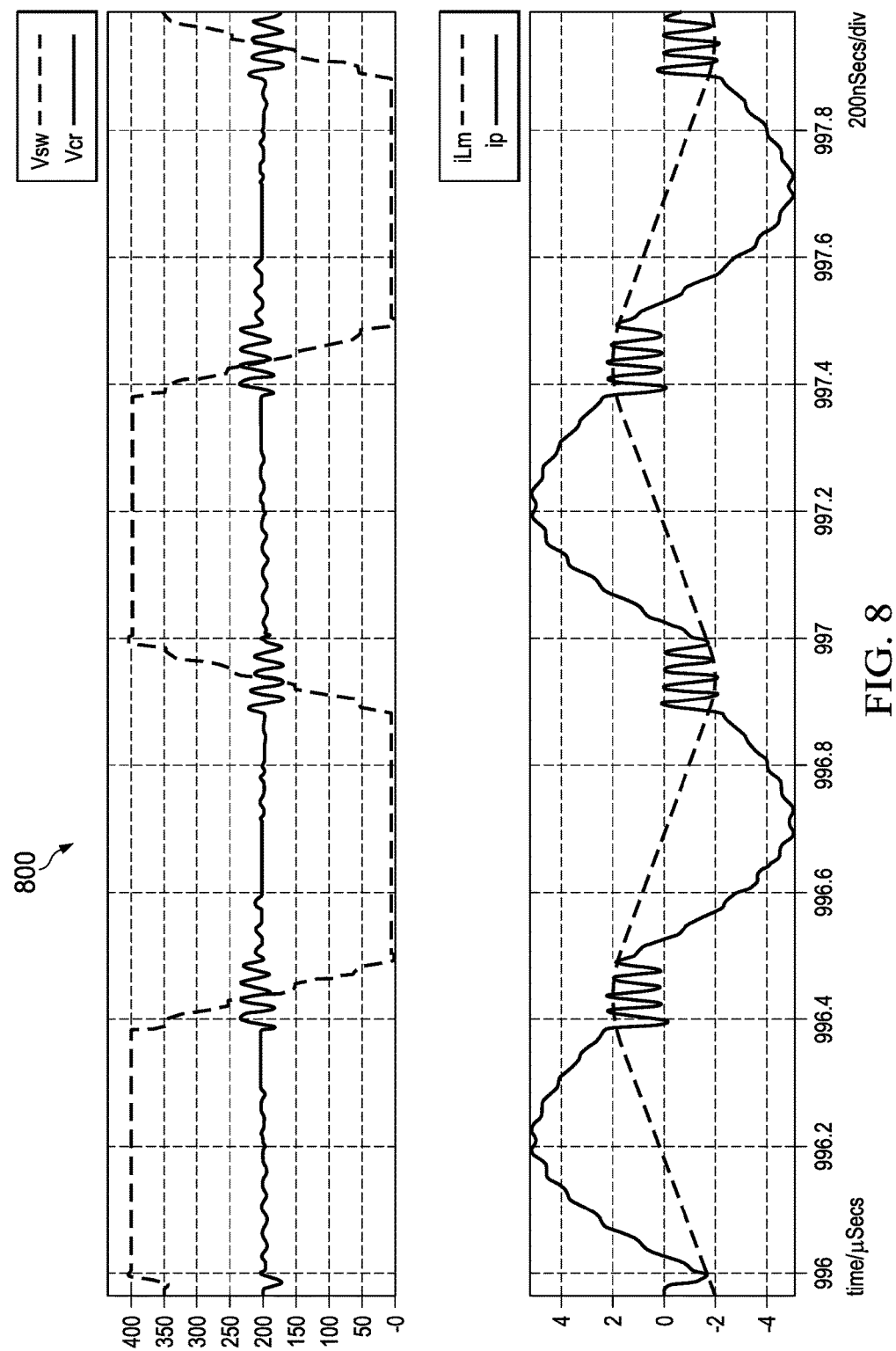
FIG. 8 depicts example simulation waveforms corresponding to a simulated operation of the example LLC resonant converter with the example integrated LLC transformer of FIG. 1.

FIG. 8 depicts example simulation waveforms 800 corresponding to a simulated operation of the example LLC resonant converter 100 with the example integrated LLC transformer 102 of FIG. 1. The example simulation waveforms 800 of FIG. 8 consider parasitic capacitance. The example simulation waveforms 800 of FIG. 8 includes the high-frequency switching node voltage ripple, which corresponds to the experimental waveforms 500, 502 as depicted in FIG. 5. The high-frequency switching node voltage ripple of FIG. 8 may be due to a significant high-frequency ripple current on the input side transformer current ip (e.g., current ip as depicted in FIG. 1). The current iLm refers to the current flowing through one of the primary winding inductances Lm 144b, 148b of FIG. 1. In some examples, the high-frequency ripple current causes additional loss on the transformer 102 of FIG. 1, and, therefore, in such examples, low $C_{oss}$ switches (e.g., GaN FETs as described above in connection with FIG. 1) should be used to minimize a winding capacitance of the transformer 102.

FIG. 9 is a perspective view of an example implementation 900 of the example LLC resonant converter 100 with the integrated LLC transformer 102 of FIG. 1. The example implementation 900 of FIG. 9 includes the switching circuit 110 of FIG. 1 (e.g., Texas Instruments LMG3410 or similar), the integrated transformer 102 of FIG. 1 including the secondary transistors SR1-SR8 160, 162, 164, 166 of FIG. 1 and the output capacitors C1-C8 174, 176, 184, 186 of FIG. 1, the primary controller 188 of FIG. 1, and a bias supply 902.

Figure 10:
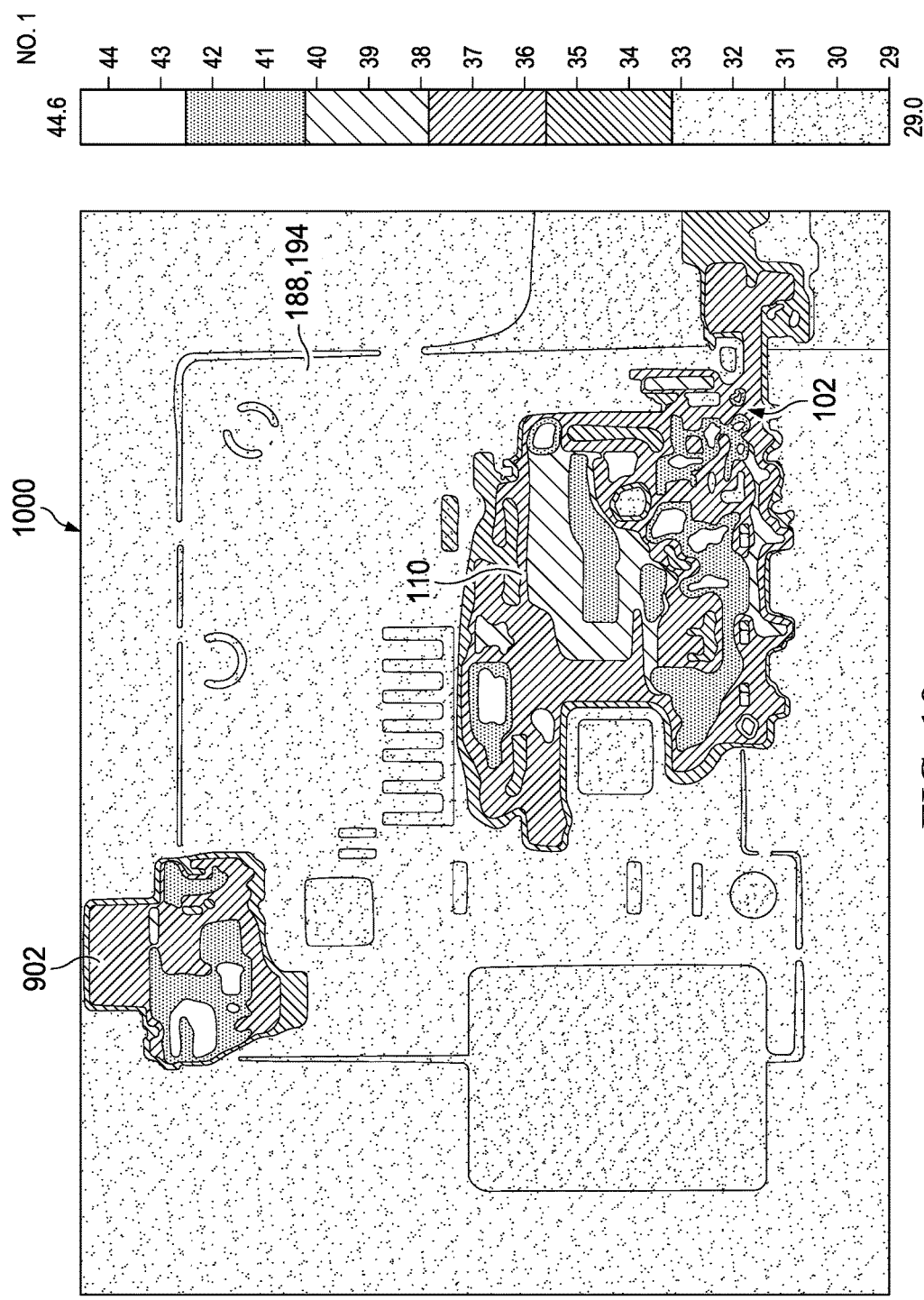
FIG. 10 depicts an example thermal image of the example LLC resonant converter with the integrated LLC transformer of FIG. 1 at full power operation.

FIG. 10 depicts an example thermal image 1000 of the example LLC resonant converter 100 with the integrated LLC transformer 102 of FIG. 1 at full power operation (e.g., approximately full power operation). In the example thermal image 1000, the example converter 100 is operated at 1 kilowatt (kW). At 1 kW operation, the example thermal image 1000 depicts a maximum temperature on a surface of transformer 102 of approximately 45 degrees Centigrade with forced air cooling used.

FIG. 11 is an example graph 1100 depicting measured and estimated efficiency with respect to output power of the example LLC resonant converter 100 with the integrated LLC transformer 102 of FIG. 1. As depicted in FIG. 11, the converter 100 of FIG. 1 achieves a peak efficiency (without bias power) of approximately 97.6% and a power density of 140 W/inch.

From the foregoing, it will be appreciated that example apparatus have been disclosed that facilitate compact LLC resonant converter structures including an integrated transformer, a resonant inductor, SR MOSFETs, and one or more output capacitors. Using FETs such as GaN FETs for the primary side switches Q1 and Q2 further reduces gate driver loss and turn-off loss. Using the integrated transformer with stacked core structures, infinity shaped primary and secondary windings, and SR FETs reduce the core loss and winding loss. The SR MOSFETs and output capacitors are integrated into secondary side windings to eliminate the leakage inductance and AC winding resistance due to termination.

Disclosed examples provide advantageous solutions for high-performance server and telecommunication applications that demand high efficiency and high-power density, along with the zero-voltage switching and zero-current switching advantages of LLC resonant converters. The disclosed examples facilitate higher frequency operation to reduce the magnetic component sizes and increase power density, while using the integrated magnetic circuits to reduce magnetic components losses at higher switching frequencies in addition to reducing the AC resistance of transformer loss. The use of GaN or other wide band primary transistors Q1 and Q2 reduces the switching losses to further facilitate high frequency operation in compact, efficient converters.

Although certain example apparatus have been disclosed herein, the scope of coverage of this patent is not limited thereto. On the contrary, this patent covers all methods, apparatus and articles of manufacture fairly falling within the scope of the claims of this patent.

What is claimed is:

1. A power conversion system, comprising:
   a switching circuit including a first primary side transistor coupled between a first input node and a switching node, and a second primary side transistor coupled between the switching node and a second input node;
   a series circuit including a transformer primary winding, a capacitor, and an inductor coupled in series between the switching node and the second input node;
   a transformer secondary circuit including a first transformer secondary winding and a second transformer secondary winding, the first and the second transformer secondary windings electrically between a first converter output and a second converter output; and
   a stack structure including a number of transformer core structures arranged in a stack, the transformer primary winding and the transformer secondary winding wound around at least a portion of a transformer core in an infinity winding arrangement.

2. The power conversion system of claim 1, wherein the transformer secondary circuit includes at least one of a secondary transistor or a diode coupled in series with the transformer secondary winding and the second converter output.

3. The power conversion system of claim 2, wherein the first and the second transformer secondary windings include first and second ends, the first ends of the first and the second transformer secondary windings coupled to the first converter output.

4. The power conversion system of claim 3, wherein the first and the second transformer secondary windings include first and second ends, the secondary transistor is a first secondary transistor, the transformer secondary circuit includes a second secondary transistor, the first secondary transistor coupled between the second end of the first transformer secondary winding and the second converter output, the second secondary transistor coupled between the second end of the second transformer secondary winding and the second converter output.

5. The power conversion system of claim 2, wherein at least one of the first primary side transistor, the second primary side transistor, or the secondary transistor is a gallium nitride field effect transistor.

6. The power conversion system of claim 1, wherein the stack structure includes a "U" shaped magnetic core design including a first core and a second core.

7. The power conversion system of claim 1, further including a control circuit including a first set of outputs to provide a first set of switching control signals to alternately turn the first and the second primary side transistors on and off to alternately couple the switching node to the first and the second input nodes to provide AC signals to the transformer primary winding.

8. The power conversion system of claim 1, wherein the stack structure is to provide a single magnetic circuit to magnetically couple the transformer primary winding, the inductor, and the transformer secondary circuit.

9. The power conversion system of claim 1, wherein the transformer primary winding and the transformer secondary winding are conductive structures formed on or in a printed circuit board structure.

10. The power conversion system of claim 9, wherein the transformer secondary winding is a first transformer secondary winding, the printed circuit board structure includes a second transformer secondary winding, the transformer primary winding between the first and the second transformer secondary windings.

11. The power conversion system of claim 9, wherein the transformer primary winding includes a first layer and a second layer, the first layer being a top surface and the second layer being a bottom surface of a layer in the printed circuit board structure.

12. The power conversion system of claim 11, wherein a first current and a second current go to different layers of the printed circuit board structure at an intersection of the infinity winding arrangement.

13. The power conversion system of claim 11, wherein a first current on the first layer and a second current on the second layer operate as parallel windings at a non-intersection of the infinity winding arrangement.

14. The power conversion system of claim 9, wherein the transformer secondary winding includes a first layer and a second layer, the first layer being a top surface and the second layer being a bottom surface of a layer in the printed circuit board structure.

15. The power conversion system of claim 9, wherein the transformer secondary circuit includes at least one of a secondary transistor or a diode coupled in series with the transformer secondary winding and the second converter output, the secondary transistor or the diode and an output capacitor of the transformer secondary circuit are mounted on the printed circuit board structure.

16. The power conversion system of claim 1, wherein the transformer core structures are spaced from one another in the stack structure to provide gaps between each transformer core structure and an adjacent transformer core structure.

17. An integrated magnetic circuit for a resonant converter, comprising:
a plurality of transformer cells arranged in a stack structure, the individual transformer cells including:
a transformer core structure;
a transformer primary winding formed as a conductive structure on or in a transformer cell printed circuit board (PCB) extending around one or more transformer cores in an infinity winding arrangement;
a transformer secondary winding formed as a conductive structure on or in the transformer cell PCB extending around the one or more transformer cores in the infinity winding arrangement; and
a secondary transistor or a diode mounted on the transformer cell PCB and coupled in series with the transformer secondary winding between a first converter output and a second converter output.

18. The integrated magnetic circuit of claim 17, wherein the transformer secondary winding is a first transformer secondary winding, the secondary transistor is a first secondary transistor, the individual transformer cells further including:
a second transformer secondary winding, the first and the second transformer secondary windings formed as conductive structures on or in the transformer cell PCB extending around the one or more transformer cores, the transformer secondary windings individually including first and second ends, the first ends of the first and second transformer secondary windings coupled to the first converter output; and
a second secondary transistor, the first secondary transistor coupled between the second end of the first transformer secondary winding and the second converter output, the second secondary transistor coupled between the second end of the second transformer secondary winding and the second converter output.

19. An LLC resonant converter, comprising:
a switching circuit to provide an alternating voltage at a switching node;
a capacitor, an inductor, and a plurality of transformer primary circuits coupled in a series circuit between the switching node and a reference node;
a plurality of transformer cells arranged in a stack structure, the individual transformer cells including:
a transformer core structure;
a transformer primary winding extending around one or more transformer cores in an infinity winding arrangement;
a transformer secondary winding extending around the one or more transformer cores in the infinity winding arrangement; and
a secondary transistor or a diode coupled in series with the transformer secondary winding between a first converter output and a second converter output; and
a control circuit including a first output to provide a primary side switching control signal to operate a switch of the switching circuit to provide the alternating voltage at the switching node.

20. The LLC resonant converter of claim 19, wherein the transformer secondary winding is a first transformer secondary winding, the secondary transistor is a first secondary transistor, the individual transformer cells further including:
- a second transformer secondary winding, the first and the second transformer secondary windings formed as conductive structures on or in the transformer cell PCB extending around the one or more transformer cores, the transformer secondary windings individually including first and second ends, the first ends of the first and second transformer secondary windings coupled to the first converter output; and
- a second secondary transistor, the first secondary transistor coupled between the second end of the first transformer secondary winding and the second converter output, the second secondary transistor coupled between the second end of the second transformer secondary winding and the second converter output.

\* \* \* \* \*